United States Patent
van der Westhuizen

(10) Patent No.: US 9,205,913 B2
(45) Date of Patent: Dec. 8, 2015

(54) ROTORCRAFT, DYNAMIC, CG MANAGEMENT APPARATUS AND METHOD

(71) Applicant: Jacob J. van der Westhuizen, South Jordan, UT (US)

(72) Inventor: Jacob J. van der Westhuizen, South Jordan, UT (US)

(73) Assignee: GROEN BROTHERS AVIATION, INC., Salt Lake City, UT (US)

( * ) Notice: Subject to any disclaimer, the term of this patent is extended or adjusted under 35 U.S.C. 154(b) by 375 days.

(21) Appl. No.: 13/623,778

(22) Filed: Sep. 20, 2012

(65) Prior Publication Data

US 2013/0037652 A1 Feb. 14, 2013

Related U.S. Application Data

(63) Continuation of application No. 13/433,427, filed on Mar. 29, 2012, now abandoned, which is a continuation of application No. 13/199,671, filed on Sep. 7, 2011, now Pat. No. 8,844,880, application No.

(Continued)

(51) Int. Cl.
| | |
|---|---|
| *B64C 17/10* | (2006.01) |
| *B64D 37/04* | (2006.01) |
| *B64C 39/04* | (2006.01) |
| *B64C 27/02* | (2006.01) |

(52) U.S. Cl.
CPC .............. *B64C 17/10* (2013.01); *B64C 27/02* (2013.01); *B64C 27/027* (2013.01); *B64C 39/04* (2013.01); *B64D 37/04* (2013.01)

(58) Field of Classification Search
CPC ...... B64C 17/10; B64C 27/02; B64C 27/027; B64C 39/04; B64D 37/00; B64D 37/04
See application file for complete search history.

(56) References Cited

U.S. PATENT DOCUMENTS

| | | | | |
|---|---|---|---|---|
| 2,601,463 | A | | 6/1952 | Stanley |
| 2,823,880 | A | * | 2/1958 | Bergeson .................. 244/135 C |
| 3,383,078 | A | * | 5/1968 | Shohet et al. ............. 244/135 R |
| 3,409,248 | A | * | 11/1968 | Bryan ............................... 244/6 |
| 3,494,424 | A | | 2/1970 | Stanley |
| 3,957,226 | A | | 5/1976 | Daggett, Jr. et al. |
| 4,099,671 | A | | 7/1978 | Leibach |
| 4,200,252 | A | | 4/1980 | Logan et al. |

(Continued)

OTHER PUBLICATIONS

Fairey Aviation Company, The Fairey Rotodyne 40-44 Passenger Helicopter, England, May 1954.

(Continued)

*Primary Examiner* — Joseph W Sanderson
(74) *Attorney, Agent, or Firm* — Pate Baird, PLLC

(57) ABSTRACT

An aircraft is disclosed having an engine and a propeller mounted to a fuselage. An empennage mounts to the aircraft and includes first and second horizontal stabilizers separated by a distance greater than the diameter of a stream tube of the propeller at the horizontal stabilizers. A rudder extends between the horizontal stabilizers and is positioned within the stream tube of the propeller. A bulkhead is positioned rearward from the cockpit and oriented perpendicular to a longitudinal axis of the airframe. A tailboom and engine are mounted to the airframe by means of the bulkhead having the engine mounted between the tailboom and a lower edge of the bulkhead. Landing gear may mount to the bulkhead proximate a lower edge thereof. Systems and methods redistribute fuel among laterally, vertically, and longitudinally opposed fuel tanks to maintain a center of gravity in a dynamically stable position.

17 Claims, 12 Drawing Sheets

Related U.S. Application Data

13/623,778, which is a continuation of application No. 13/199,684, filed on Sep. 7, 2011, now Pat. No. 9,022,314, application No. 13/623,778, which is a continuation of application No. 13/199,678, filed on Sep. 7, 2011, now Pat. No. 9,073,631, application No. 13/623,778, which is a continuation of application No. 13/623,778, application No. 13/623,778, which is a continuation of application No. 13/199,682, filed on Sep. 7, 2011, now Pat. No. 8,931,728, application No. 13/623,778, which is a continuation of application No. 13/199,681, filed on Sep. 7, 2011, now Pat. No. 8,950,699, application No. 13/623,778, which is a continuation of application No. 13/199,677, filed on Sep. 7, 2011, now Pat. No. 8,939,394, application No. 13/623,778, which is a continuation of application No. 13/199,679, filed on Sep. 7, 2011, now Pat. No. 8,668,162, application No. 13/623,778, which is a continuation of application No. 13/199,720, filed on Sep. 7, 2011, now Pat. No. 9,120,564, application No. 13/623,778, which is a continuation of application No. 13/373,439, filed on Nov. 14, 2011, now Pat. No. 8,894,791, application No. 13/623,778, which is a continuation of application No. 13/199,719, filed on Sep. 7, 2011, now abandoned, application No. 13/623,778, which is a continuation of application No. 13/199,721, filed on Sep. 7, 2011, now Pat. No. 8,915,465, application No. 13/623,778, which is a continuation of application No. 13/199,705, filed on Sep. 7, 2011, now Pat. No. 8,973,863, application No. 13/623,778, which is a continuation of application No. 13/427,696, filed on Mar. 22, 2012, now Pat. No. 9,079,659, application No. 13/623,778, which is a continuation of application No. 13/282,749, filed on Oct. 27, 2011, now Pat. No. 8,939,395, application No. 13/623,778, which is a continuation of application No. 13/199,712, filed on Sep. 7, 2011, application No. 13/623,778, which is a continuation of application No. 13/282,780, filed on Oct. 27, 2011, now abandoned, application No. 13/623,778, which is a continuation of application No. 13/282,815, filed on Oct. 27, 2011, now Pat. No. 8,931,731, application No. 13/623,778, which is a continuation of application No. 13/282,877, filed on Oct. 27, 2011, now Pat. No. 8,944,365, application No. 13/623,778, which is a continuation of application No. 13/282,938, filed on Oct. 27, 2011, now Pat. No. 8,950,700, application No. 13/623,778, which is a continuation of application No. 13/373,406, filed on Nov. 14, 2011, now Pat. No. 8,991,748, application No. 13/623,778, which is a continuation of application No. 13/283,461, filed on Oct. 27, 2011, now Pat. No. 9,056,674, application No. 13/623,778, which is a continuation of application No. 13/282,985, filed on Oct. 27, 2011, now Pat. No. 8,960,594, application No. 13/623,778, which is a continuation of application No. 13/317,749, filed on Oct. 27, 2011, now Pat. No. 9,144,944, application No. 13/623,778, which is a continuation of application No. 13/317,750, filed on Oct. 27, 2011, now Pat. No. 9,139,297, application No. 13/623,778, which is a continuation of application No. 13/317,751, filed on Oct. 27, 2011, now abandoned, application No. 13/623,778, which is a continuation of application No. 13/349,201, filed on Jan. 12, 2012, now abandoned, application No. 13/623,778, which is a continuation of application No. 13/373,421, filed on Nov. 14, 2011, application No. 13/623,778, which is a continuation of application No. 13/373,433, filed on Nov. 14, 2011, now Pat. No. 9,038,940, application No. 13/623,778, which is a continuation of application No. 13/373,413, filed on Nov. 14, 2011, now abandoned, application No. 13/623,778, which is a continuation of application No. 13/373,440, filed on Nov. 14, 2011, application No. 13/623,778, which is a continuation of application No. 13/334,261, filed on Dec. 22, 2011, now Pat. No. 8,998,127, application No. 13/623,778, which is a continuation of application No. 13/335,541, filed on Dec. 22, 2011, now Pat. No. 9,022,313, application No. 13/623,778, which is a continuation of application No. 13/373,414, filed on Nov. 14, 2011, now Pat. No. 8,991,745, application No. 13/623,778, which is a continuation of application No. 13/373,412, filed on Nov. 14, 2011, now Pat. No. 8,991,744, application No. 13/623,778, which is a continuation of application No. 13/373,420, filed on Nov. 14, 2011, now abandoned, application No. 13/623,778, which is a continuation of application No. 13/545,904, filed on Jul. 10, 2012, now Pat. No. 8,752,786, application No. 13/623,778, which is a continuation of application No. 13/605,951, filed on Sep. 6, 2012, now Pat. No. 8,944,366, and application No. 13/545,904, Jul. 10, 2012, application No. 13/623,778, which is a continuation of application No. 13/544,874, filed on Jul. 9, 2012, now Pat. No. 9,004,394.

(60) Provisional application No. 61/539,668, filed on Sep. 27, 2011, provisional application No. 61/468,964, filed on Mar. 29, 2011, provisional application No. 61/381,291, filed on Sep. 9, 2010, provisional application No. 61/403,099, filed on Sep. 9, 2010, provisional application No. 61/403,097, filed on Sep. 9, 2010, provisional application No. 61/381,313, filed on Sep. 9, 2010, provisional application No. 61/403,111, filed on Sep. 9, 2010, provisional application No. 61/381,347, filed on Sep. 9, 2010, provisional application No. 61/403,136, filed on Sep. 9, 2010, provisional application No. 61/403,134, filed on Sep. 9, 2010, provisional application No. 61/460,572, filed on Jan. 3, 2011, provisional application No. 61/403,098, filed on Sep. 9, 2010, provisional application No. 61/403,081, filed on Sep. 9, 2010, provisional application No. 61/403,135, filed on Sep. 9, 2010, provisional application No. 61/466,177, filed on Mar. 22, 2011, provisional application No. 61/409,475, filed on Nov. 2, 2010, provisional application No. 61/403,113, filed on Sep. 9, 2010, provisional application No. 61/409,478, filed on Nov. 2, 2010, provisional application No. 61/409,476, filed on Nov. 2, 2010, provisional application No. 61/409,482, filed on Nov. 2, 2010, provisional application No. 61/409,470, filed on Nov. 2, 2010, provisional application No. 61/517,413, filed on Apr. 19, 2011, provisional application No. 61/409,487, filed on Nov. 2, 2010, provisional application No. 61/409,494, filed on Nov. 2, 2010, provisional application No. 61/456,219, filed on Nov. 2, 2010, provisional application No. 61/456,221, filed on Nov. 2, 2010, provisional application No. 61/456,220, filed on Nov. 2, 2010, provisional application No. 61/432,488, filed on Jan. 13, 2011, provisional application No. 61/519,075, filed on May 16, 2011, provisional application No. 61/519,055, filed on May 16, 2011, provisional application No. 61/460,573, filed on Jan. 4, 2011, provisional application No. 61/461,223, filed on Jan. 13,

Related U.S. Application Data 2011, provisional application No. 61/429,282, filed on Jan. 3, 2011, provisional application No. 61/429,289, filed on Jan. 3, 2011, provisional application No. 61/575,196, filed on Aug. 17, 2011, provisional application No. 61/575,204, filed on Aug. 18, 2011, provisional application No. 61/626,783, filed on Oct. 3, 2011, provisional application No. 61/499,996, filed on Jun. 22, 2011, provisional application No. 61/532,233, filed on Sep. 8, 2011, provisional application No. 61/506,572, filed on Jul. 11, 2011.

(56) References Cited

U.S. PATENT DOCUMENTS

| | | | |
|---|---|---|---|
| 4,589,611 | A | 5/1986 | Ramme et al. |
| 4,591,115 | A * | 5/1986 | DeCarlo .................. 244/135 C |
| 5,209,430 | A | 5/1993 | Wilson et al. |
| 5,934,873 | A | 8/1999 | Greene |
| 6,280,141 | B1 | 8/2001 | Rampal et al. |
| 6,352,220 | B1 | 3/2002 | Banks et al. |
| 6,885,917 | B2 | 4/2005 | Osder et al. |
| 7,147,182 | B1 | 12/2006 | Flanigan |
| 8,231,082 | B2 * | 7/2012 | Delporte et al. .......... 244/135 C |
| 8,548,721 | B2 * | 10/2013 | Paillard et al. ................ 701/124 |
| 8,881,764 | B2 * | 11/2014 | Smith et al. .............. 137/565.01 |
| 2005/0051666 | A1 * | 3/2005 | Lee et al. ........................ 244/10 |
| 2009/0088911 | A1 * | 4/2009 | Paillard et al. .................... 701/4 |
| 2009/0272851 | A1 * | 11/2009 | Delporte et al. .......... 244/135 C |
| 2010/0044515 | A1 * | 2/2010 | Neto ........................ 244/135 C |
| 2011/0036939 | A1 * | 2/2011 | Easter ............................... 244/2 |
| 2012/0111417 | A1 * | 5/2012 | Smith et al. ..................... 137/14 |
| 2012/0111997 | A1 * | 5/2012 | White ............................ 244/87 |

OTHER PUBLICATIONS

K. T. McKenzie, The Journal of The Helicopter Association of Great Britain, Aerodynamic Aspects of the Fairey Rotodyne, Dec. 1959.
David H. Hickey, NACA Research Memorandum, Full-Scale Wind-Tunnel Tests, National Advisory Committee for Aeronautics, May 17, 1956.
Watson H. Tanner, Charts for Estimating Rotary Wing Performance in Hover and at High Forward Speeds, NASA Contractor Report, Nov. 1964.
John Ballard et al., An Investigation of a Stoppable Helicopter Rotor with Circulation Control NASA, Aug. 1980.
Fairey Aviation Limited, Fairey Rotodyne Design Z, Mar. 23, 1960.
Fairey Rotodyne Description and Drawings, estimated 1959.
Fairey Rotodyne Description Specifications, estimated 1959.
G.S. Hislop, The Fairey Rotodyne, A paper to be presented to a Joint Meeting of the Helicopter Association of Great Britain, Nov. 7, 1958.
A. Stepan, Journal of the Helicopter Association of Great Britain—vol. 13, No. 6, Dec. 1949.
A. Stepan, Journal of the Royal Aeronautical Society, London, Feb. 1958.
Fairey Rotodyne-Type 20Z 10W and Performance, Technical Publications, Project 79, Issue 2, Feb. 1959.
Fairey Aviation Company, Fairey Rotodyne, Weights and performance Index, estimated 1959.
Fairey Aviation Company, The Fairey Rotodyne 40-48 Passenger Helicopter, England, estimated 1959.
Fairey Aviation Company, The Fairey Rotodyne Design Certificate, estimated 1959.
Fairey Aviation Company, Tactical Mobility, Fairey Rotodyne for the Services, estimated 1959.
Bruce D. Charles et al., Wind Tunnel Investigation of Semi rigid Full-Scale Rotors Operating a High Advance Ratios, U.S. Army Aviation Material Laboratories, Fort Eustis, Virginia, Jan. 1969.

* cited by examiner

ROTORCRAFT, DYNAMIC, CG MANAGEMENT APPARATUS AND METHOD

RELATED APPLICATIONS

This application: claims the benefit of U.S. Provisional Patent Application Ser. No. 61/539,668, filed on Sep. 27, 2011 which is hereby incorporated by reference.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

BACKGROUND

1. The Field of the Invention

This invention relates to rotating wing aircraft, and, more particularly to rotating wing aircraft relying on autorotation of a rotor to provide lift.

2. The Background Art

Rotating wing aircraft rely on a rotating wing to provide lift. In contrast, fixed wing aircraft rely on air flow over a fixed wing to provide lift. Fixed wing aircraft must therefore achieve a minimum ground velocity on takeoff before the lift on the wing is sufficient to overcome the weight of the plane. Fixed wing aircraft therefore generally require a long runway along which to accelerate to achieve this minimum velocity and takeoff.

In contrast, rotating wing aircraft can take off and land vertically or along short runways inasmuch as powered rotation of the rotating wing provides the needed lift. This makes rotating wing aircraft particularly useful for landing in urban locations or undeveloped areas without a proper runway.

The most common rotating wing aircraft in use today are helicopters. A helicopter typically includes an airframe, housing an engine and passenger compartment, and a rotor, driven by the engine, to provide lift. Forced rotation of the rotor causes a reactive torque on the airframe. Accordingly, conventional helicopters require either two counter-rotating rotors or a tail rotor in order to counteract this reactive torque.

Another type of rotating wing aircraft is the autogyro. An autogyro aircraft derives lift from an unpowered, freely rotating rotor or plurality of rotary blades. The energy to rotate the rotor results from a windmill-like effect of air passing through the underside of the rotor. The forward movement of the aircraft comes in response to a thrusting engine such as a motor driven propeller mounted fore or aft.

During the developing years of aviation aircraft, autogyro aircraft were proposed to avoid the problem of aircraft stalling in flight and to reduce the need for runways. The relative airspeed of the rotating wing is largely independent of the forward airspeed of the autogyro, allowing slow ground speed for takeoff and landing, and safety in slow-speed flight. Engines may be tractor-mounted on the front of an autogyro or pusher-mounted on the rear of the autogyro.

Airflow passing the rotary wing, alternately called rotor blades, which are tilted upward toward the front of the autogyro, act somewhat like a windmill to provide the driving force to rotate the wing, i.e., autorotation of the rotor. The Bernoulli effect of the airflow moving over the rotor surface creates lift.

Various autogyro devices in the past have provided some means to begin rotation of the rotor prior to takeoff, thus further minimizing the takeoff distance down a runway. One type of autogyro is the "gyrodyne," which includes a gyrodyne built by Fairey aviation in 1962 and the XV-1 convertiplane first flight tested in 1954. The gyrodyne includes a thrust source providing thrust in a flight direction and a large rotor for providing autorotating lift at cruising speeds. To provide initial rotation of the rotor, jet engines were secured to the tip of each blade of the rotor and powered during takeoff, landing, and hovering.

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter.

In one aspect of the invention, an aircraft includes an airframe defining a center plane extending in longitudinal and vertical directions. A rotor is mounted to the airframe and defines a rotor thrust vector. A propulsion source is also mounted to the airframe and defines a propulsion thrust vector.

Multiple fuel tanks are distributed in one or more of laterally opposed positions, longitudinally opposed positions, and vertically opposed positions. A fuel distribution system is coupled to the plurality of fuel tanks and one or more pumps are in fluid communication with the fuel distribution system. a control system is configured to actuate the one or more pumps effective to redistribute fuel among the plurality of fuel tanks effective to urge a center of gravity of the aircraft closer toward a more dynamically stable position.

In one aspect of the invention, the dynamically stable position is located vertically proximate a trajectory of the propulsion thrust vector and longitudinally forward of a trajectory of the rotor thrust vector. The dynamically stable position is preferably located on the center plane. In another aspect of the invention, the dynamically stable position is positioned vertically below a trajectory of the propulsion thrust vector and longitudinally aft of a trajectory of the rotor thrust vector.

In another aspect of the invention, the plurality of fuel tanks includes fuel tanks distributed in laterally opposed positions and the control system is programmed to redistribute fuel among the plurality of fuel tanks effectively to urge the center of gravity closer to the center plane. In some embodiments, the plurality of fuel tanks includes fuel tanks distributed in vertically opposed positions and fuel tanks distributed in longitudinally opposed positions.

In such embodiments, the control system may be further programmed to redistribute fuel among the fuel tanks distributed in vertically opposed positions effective to urge the center of gravity toward the propulsion thrust vector. The control system may likewise redistribute fuel among the fuel tanks distributed in longitudinally opposed positions effective to urge the center of gravity forward of a trajectory of the propulsion thrust vector.

In some embodiments, the control system is programmed to redistribute fuel among the fuel tanks distributed in vertically opposed positions to effectively urge the center of gravity below a trajectory of the propulsion thrust vector and redistribute fuel among the fuel tanks distributed in longitudinally opposed positions effective to urge the center of gravity rearward of a trajectory of the propulsion thrust vector.

In another aspect of the invention, the airframe includes a pair of tailbooms and an empennage mounted to the airframe by means of the tailbooms. The plurality of fuel tanks may include fuel tanks positioned within the tailbooms. The airframe may further include wings extending laterally therefrom and fuel tanks positioned within the wings. A fuel tank may further mount adjacent a pylon supporting the rotor.

A corresponding method of operation is also disclosed and claimed.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
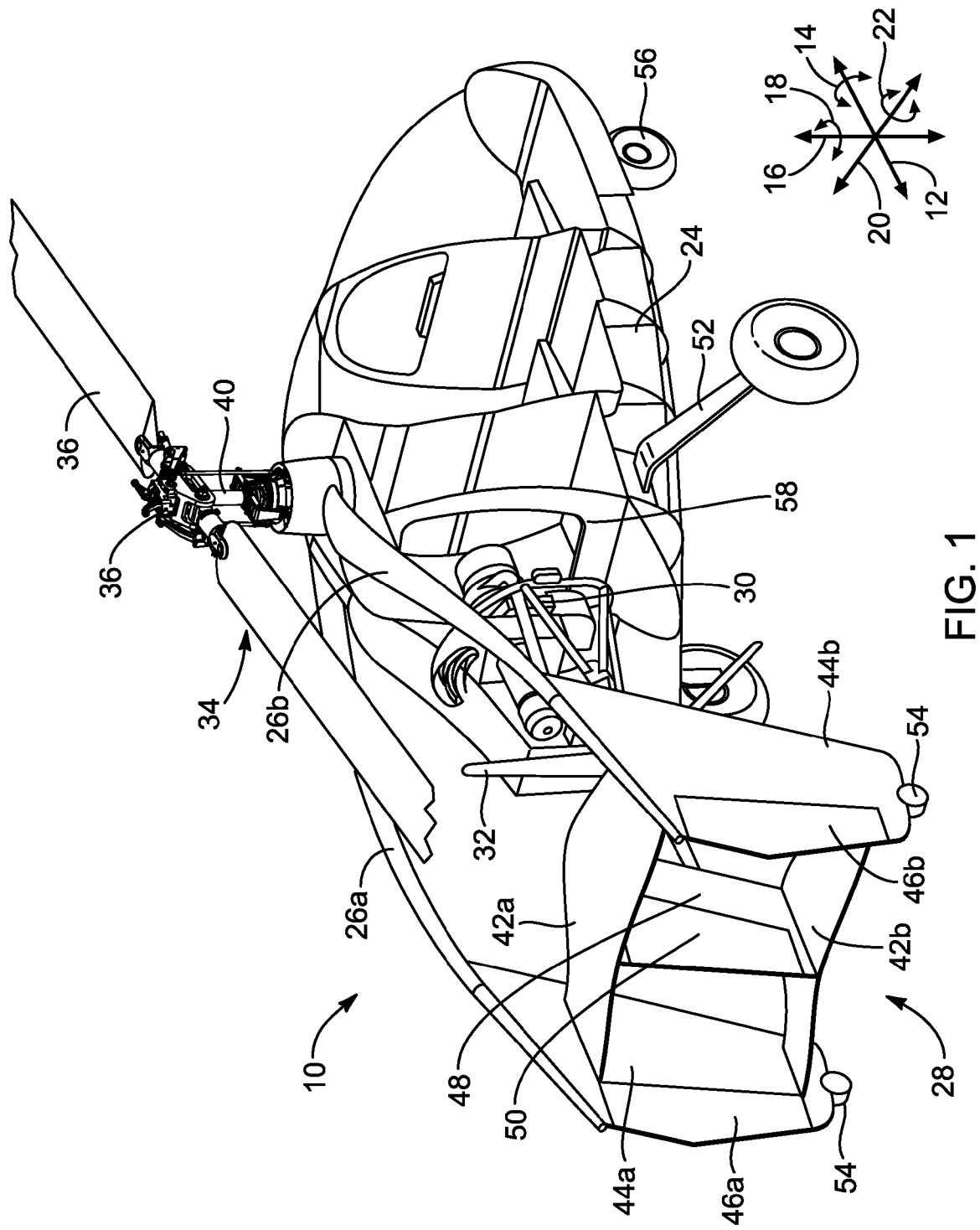
FIG. 1 is an isometric view of a rotorcraft in accordance with an embodiment of the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

This patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

Referring to FIG. 1, an aircraft 10 may define a longitudinal direction 12, which corresponds generally to the direction of flight of the aircraft during sustained translational flight. A roll direction 14 may be defined as a rotation about an axis parallel to the longitudinal direction 12. A vertical direction 16 may be defined as perpendicular to the longitudinal axis and generally parallel to the force of gravity during sustained translational flight.

A yaw direction 18 may be defined as rotation about an axis parallel to the vertical direction 16. A lateral direction 20 may be defined as a perpendicular to both the longitudinal direction 12 and the vertical direction 16. A pitch direction 22 may be defined as a rotation about an axis parallel to the lateral direction 20.

The aircraft 10 may include an airframe 24 containing a cockpit and corresponding flight controls, as well as any compartments for passengers, cargo, or both. One or more booms 26a, 26b secure to the airframe 24 and extend rearwardly therefrom. The booms 26a, 26b support an empennage 28 containing control surfaces for maintaining stability in the pitch direction 22 and yaw direction 18 and for controlling motion of the aircraft 10 in the yaw direction 18.

An engine 30 may also be mounted to the airframe 24 and have a propeller 32 operably coupled thereto and driven thereby. In the illustrated embodiment, the propeller 32 projects rearwardly from the airframe 24. The one or more booms 26a, 26b may function to position the empennage 28 such that the propeller 32 is positioned between the airframe 24 and empennage 28. The booms 26a, 26b may also project rearwardly from the propeller 32 sufficiently to provide a minimum separation distance between the propeller 32 and the empennage 28.

A rotor 34 may also mount to the airframe 24 and may be powered or unpowered. The rotor 34 may include two or more rotor blades 36 secured to a hub 38 rotatably mounted to a mast 40. The pitch of the blades 36 may be altered collectively, cyclically, or both as known in the art of rotorcraft design and operation. Likewise, the angle of attack of the rotor disc defined by the blades 36 may also be adjusted, such as by adjusting an angle of the mast 40 or of a head with respect to the mast 40 as known in the art of rotorcraft design and operation.

For aircraft 10 embodied as an autogyro, the rotor 34 may be powered by the engine 30 or some other power source during takeoff or landing and otherwise left unpowered, particularly during sustained longitudinal flight. During sustained longitudinal flight, the aircraft 10 is urged forward by the propeller 32 and rotation of the rotor 34 is due to autorotation as known in the art of autogyro design and operation.

The empennage 28 may include first and second horizontal stabilizers 42a, 42b. The horizontal stabilizers 42a, 42b may secure at their ends to the vertical stabilizers 44a, 44b such that the combined horizontal stabilizers 42a, 42b and vertical stabilizers 44a, 44b define a box or duct structure. Main rudders 46a, 46b may secure to trailing edges of the vertical stabilizers 44a, 44b and be selectively actuated to cause movement of the aircraft 10 in the yaw direction 18. A vertical stabilizer 48 may be positioned between the vertical stabilizers 44a, 44b and have an auxiliary rudder 50 mounted thereto. The illustrated configuration advantageously positions the auxiliary rudder 50 within the box or duct formed by the vertical stabilizers 44a, 44b and the horizontal stabilizers 42a, 42b. This arrangement provides improved thrust vectoring of air flow from the propeller 32. The improved thrust vectoring may be relied on to improve yaw control at low speeds.

The auxiliary rudder 50 may be actuated synchronously with the main rudders 46 or may be decoupled from the main rudders 46a, 46b during high speed flight, e.g., above 40 knots, such that yaw control inputs from a pilot are only coupled to the main rudders 46a, 46b. Yaw control inputs may be coupled to the auxiliary rudder 50 during low speed flight, e.g., below 40 knots, and may or may not be decoupled from the main rudders 46a, 46b.

The operation of the main rudders 46a, 46b and auxiliary rudder 50 may be as described in U.S. Provisional Patent Application Ser. No. 61/409,494, filed Nov. 2, 2010 and entitled "USE OF AUXILIARY RUDDERS FOR YAW CONTROL AT LOW SPEED," which is hereby incorporated herein by reference in its entirety.

The aircraft 10 may include main landing gear 52 including wheels or skids for engaging the ground during takeoff and landing. Additional landing gear 54, such as wheels or skids, may be mounted to the empennage 28 to avoid damage to the empennage 28 due to pitch angles during takeoff and landing. In the illustrated embodiment, the landing gear 54 mount to lower surfaces of the vertical stabilizers 44a, 44b. Nose landing gear 56 may also secure to the airframe 24 at the nose of the aircraft 10.

In some embodiments, the airframe 24 may include a bulkhead 58 embodied as a structural member that lies generally in a plane parallel to (and may actually be co-planar with) both the lateral direction 20 and the vertical direction 16. The bulkhead 58 may be a single monolithic member or may be formed of a number of constituent members. The bulkhead 58 may also be embodied as a monolithic sheet of material reinforced by additional structural members. In some embodiments, some or all of the engine 30, booms 26a, 26b, landing gear 52, and mast 40 may mount to the same bulkhead 58. In this manner, the aircraft 10 may be made lighter, since a single sturdy member supports each of the major, load-bearing components of the aircraft 10.

Figure 2:
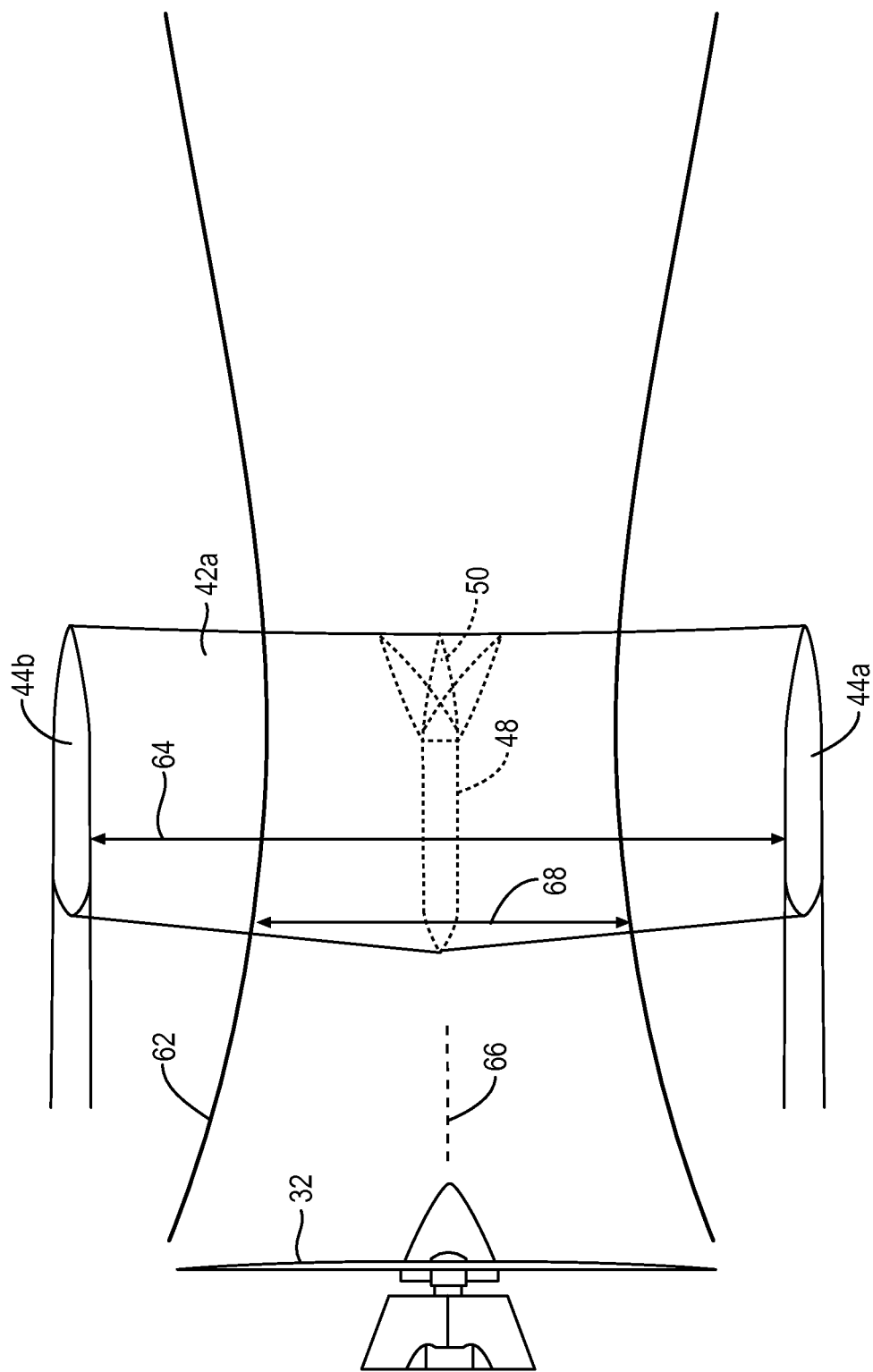
FIG. 2 is a top plan view of an empennage in accordance with an embodiment of the present invention.

Referring to FIG. 2, during operation, the propeller 32 urges air flow rearwardly and generates a stream tube 62. Due to conservation of mass, acceleration of air by the propeller 32 causes the stream tube to form a vena contracta smaller in diameter than the diameter of the propeller for a region immediately behind the propeller 32. In the illustrated embodiment, the stream tube 62 is directed through the box or duct formed by the horizontal stabilizers 42a, 42b and the vertical stabilizers 44a, 44b.

As noted above, the main rudders 46a, 46b are operable to control yaw of the aircraft at higher speeds. The main rudders 46a, 46b may therefore be positioned in the "free stream" outside of the stream tube 62 of the propeller 32. They may instead be positioned within the slip stream of the aircraft 10 in order to generate forces in the yaw direction 18 through interaction with the slip stream. Accordingly, the main rudders 46a, 46b and the vertical stabilizers 44a, 44b to which they are mounted may be separated by a distance 64.

The location of the vertical stabilizers 44a, 44b relative to the axis of rotation 66 of the propeller 32 may be such that neither of the vertical stabilizers 44a, 44b is located within the stream tube 62. Accordingly, the distance 64 may be greater than the diameter 68 of the stream tube 62 at the leading edge of the vertical stabilizers 44a, 44b or the diameter 68 of the stream tube 62 measured at the leading edge of one of the horizontal stabilizers 42a, 42b. In some embodiments, the distance 64 may be greater than the diameter of the propeller 32 or greater than a width of the airframe 24 in the lateral direction 20.

Figure 3:
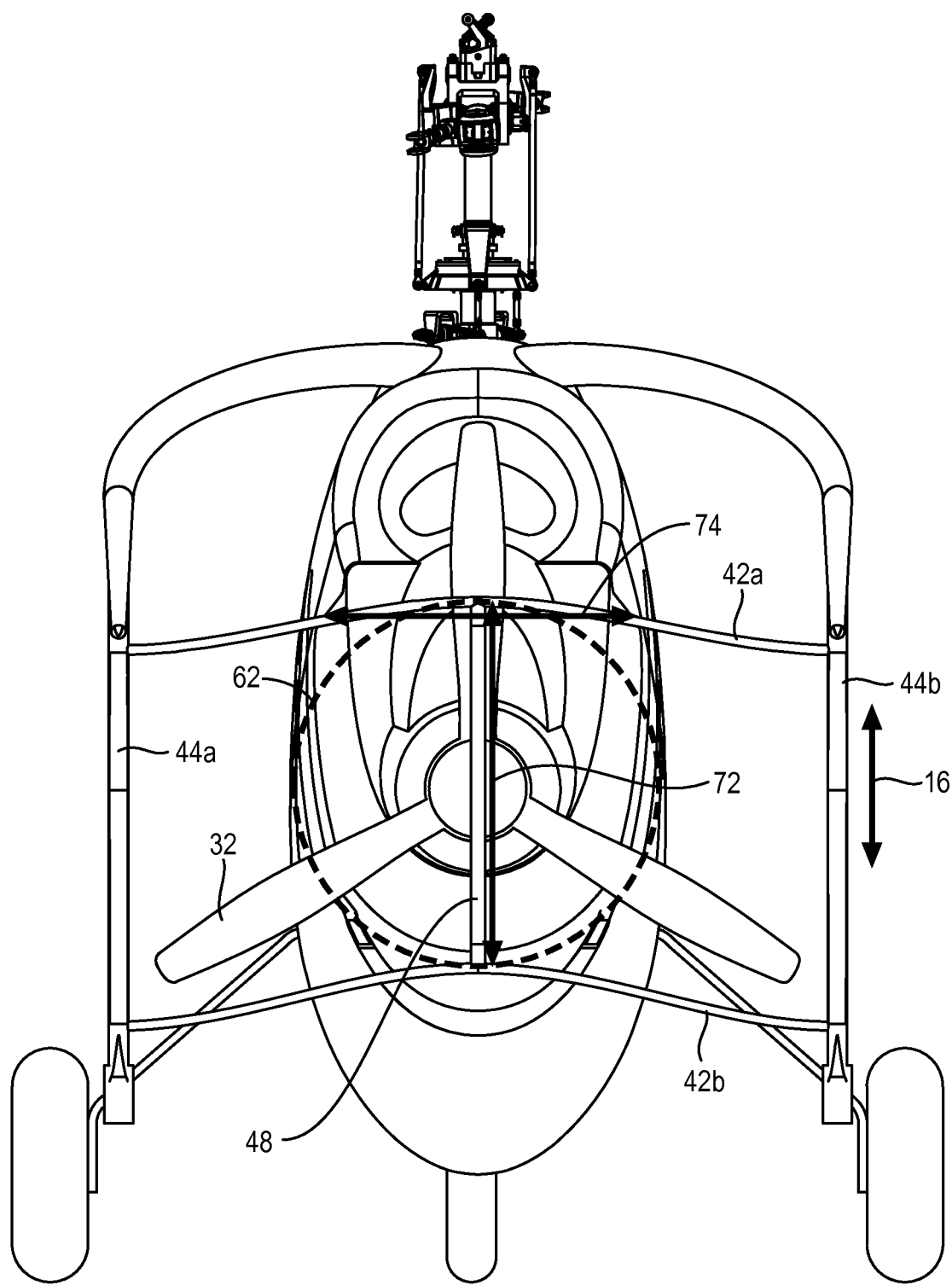
FIG. 3 is a rear elevation view of a rotorcraft incorporating an empennage in accordance with an embodiment of the present invention.

Referring to FIG. 3, the horizontal stabilizers 42a, 42b may also be positioned such that they do not significantly interact with the stream tube 62. This configuration may advantageously reduce interference by the horizontal stabilizers 42a, 42b with the stream tube 62 and increase aerodynamic efficiency of the aircraft 10. Accordingly, the horizontal stabilizers 42a, 42b may be separated by a distance 72 in the vertical direction 16 greater than the diameter of the stream tube 62 at the leading edge of either of the horizontal stabilizers 42a, 42b.

As noted above, the stream tube 62 becomes narrower than the diameter of the propeller 32 immediately behind the propeller. Accordingly, the horizontal stabilizers 42a, 42b may have a separation distance 72 less than the diameter of the propeller and still not interact with the stream tube 62. For example, the separation distance 72 may typically be between about 0.6 and about 1.2 times the diameter of the propeller 32. Alternatively, the separation distance 72 may be from about 0.6 to about 1 times the diameter of the propeller 32. Alternatively, the separation distance 72 may be from about 0.8 to about 1 times the diameter of the propeller 32. The distances may be designed to match the range of expected forward airspeeds and the thrust velocity of air through the propeller.

Aircraft may be optimized for their functionality. However, controlling parameters for comparatively low speed slight may be inconsistent with the needs of high speed flight. Likewise, rotorcraft rely on different structures and parametric values than fixed wing aircraft. High speed VTOL aircraft, as an oxymoron, will require a new design, starting with a "clean sheet of paper," so to speak.

In some embodiments, the separation distance 72 and the position of the horizontal stabilizers 42a, 42b may be such that the length 74 of the leading edge of either horizontal stabilizer 42a, 42b located within the stream tube 62 is less than ten percent of that of the horizontal stabilizer 42a, 42b for purposes of reducing drag.

As in FIG. 3, the horizontal stabilizers 42a, 42b may slope downward from the center thereof. However, in other embodiments, the horizontal stabilizers may slope upward or be straight. Where the separation distance 72 is not constant along the lengths of the horizontal stabilizers 42a, 42b, the separation distance 72 along the horizontal stabilizers 42a, 42b may be such that, for the portions of the horizontal stabilizers 42a, 42b that are horizontally coextensive with the stream tube 62, the separation distance 72 in the vertical direction 16 is always larger than the diameter of the stream tube 62.

Figure 4A:
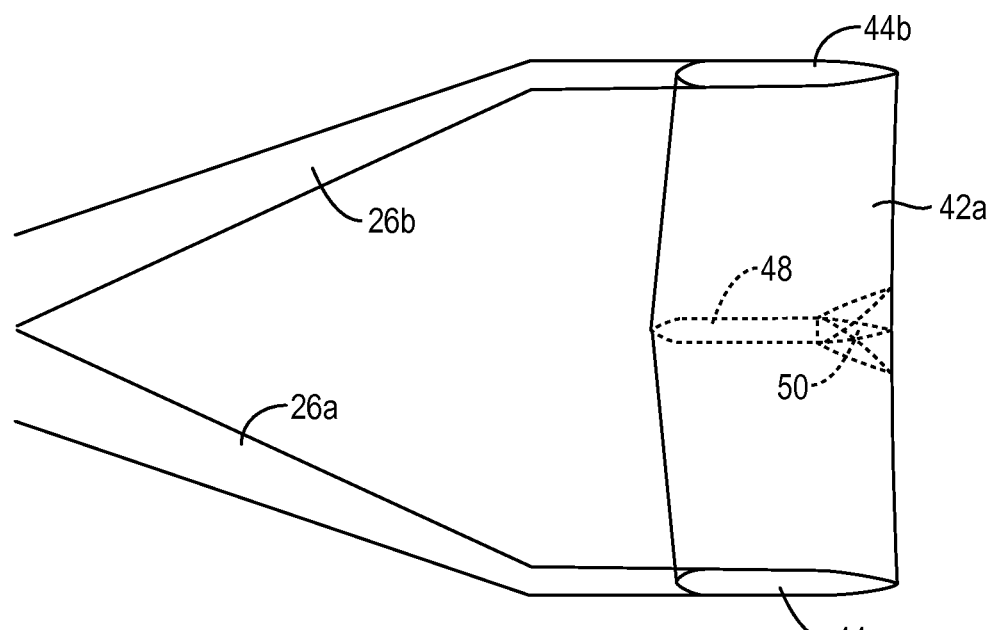
FIG. 4A is a top plan view of a boom structure for supporting an empennage in accordance with an embodiment of the present invention.
Figure 4B:
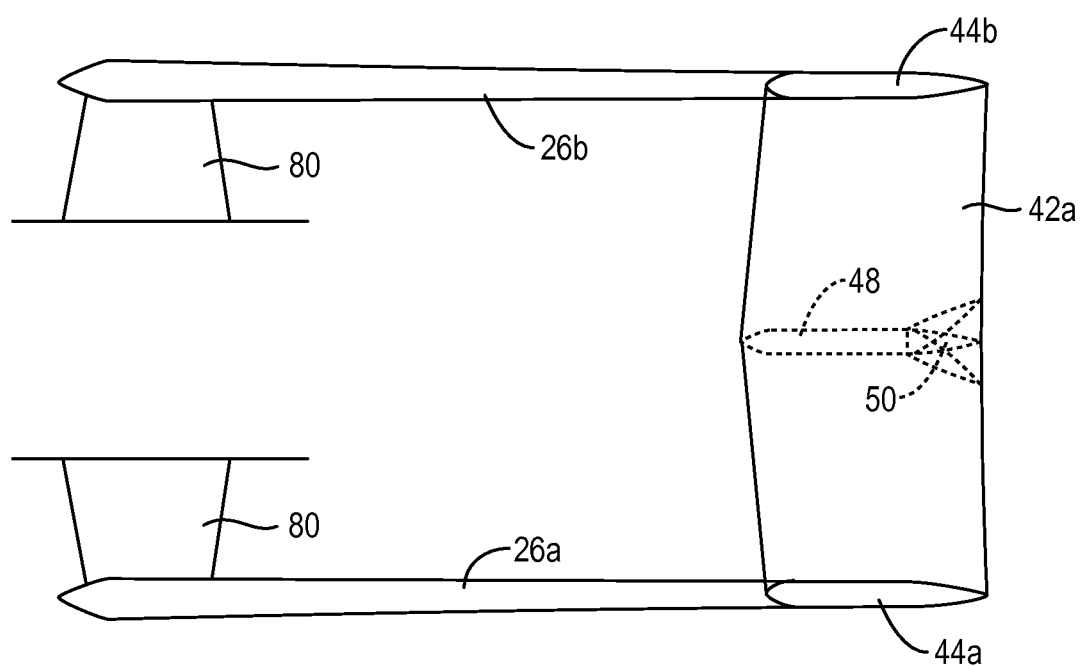
FIG. 4B is a top plan view of an alternative boom structure for supporting an empennage in accordance with an embodiment of the present invention.

Referring to FIG. 4A, while referring again to FIG. 1, in the illustrated embodiment, the booms 26a, 26b extend from the vertical stabilizers 44a, 44b and mount to the top of the fuselage 24 adjacent the mast 40. Referring to FIG. 4B, in an alternative embodiment, the booms 26a, 26b may mount to the sides of the fuselage 24. For example, wing stubs 80, having an airfoil contour, may project outward from the fuselage 24 and secure the booms 26a, 26b. Alternatively, the wing stubs 80 may be replaced by spars that do not have an airfoil contour.

For purposes of this disclosure, the stream tube 62 and the diameter of the stream tube at the leading edge of the horizontal stabilizers 42a, 42b are these values measured at a given air speed. For example, in some embodiments, the air speed at which the stream tube 62 is measured is any velocity within a range of cruising velocities for the aircraft 10, as known in the art of aircraft design. Alternatively, the velocity at which the stream tube 62 is measured is a fixed value, such as 40 knots for an autogyro aircraft.

Figure 5:
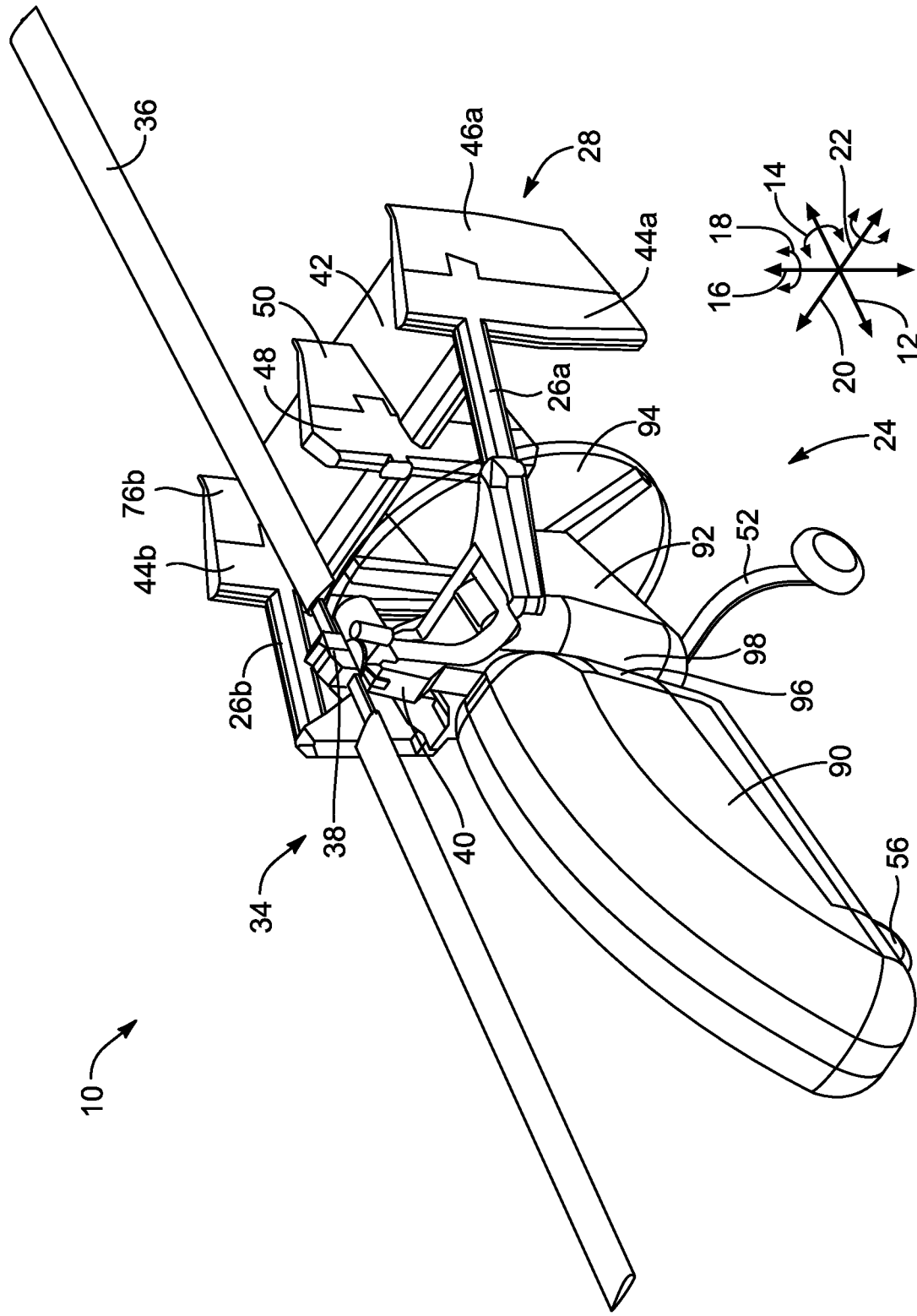
FIG. 5 is an isometric view of a rotorcraft in accordance with an embodiment of the present invention.

Referring to FIG. 5, in some embodiments, the airframe 24 may include a cockpit shell 90 or cockpit portion 90 and an aft portion 92. The cockpit shell 90 houses a seat for a pilot and may include one or more seats for passengers. The cockpit shell 90 further includes flight controls and instruments as known in the art of aircraft, particularly rotorcraft, design. The cockpit shell 90 may include one or more sheets of fiberglass, carbon fiber composite, aluminum, or the like. The cockpit shell 90 may be reinforced by a metal or composite frame. In some embodiments, the cockpit shell 90 is omitted and the pilot seat, any passenger seats, controls, and instruments are exposed to the air. In such embodiments, the cockpit shell 90 may be replaced with a metal or composite cockpit frame for supporting the components described hereinabove as being housed in the cockpit shell.

The aft portion 92 may include the engine 30 and empennage 28. In the illustrated embodiment, the empennage 28 is mounted to the airframe 24 by means of one or more tailbooms 26a, 26b that extend above the envelope 94 defined by rotation of the propeller 32.

The cockpit shell 90, or cockpit portion 90, may include a rear surface 96 and the aft portion 92 may include a bulkhead 98 mated to the rear surface 96. The bulkhead 98 may secure to the rear surface 96 or to a frame forming part of the cockpit shell 90. The bulkhead 98 may serve as a firewall isolating the engine 30 from the cockpit shell 90. A portion of the bulkhead 98 interfacing with rear surface 96 may conform to the rear surface 96. The bulkhead 98 may be formed of a monolithic sheet of metal or composite material or may be formed of members integrally fastened to one another to form a bulkhead. The bulkhead 98 may be formed of a monolithic sheet of material reinforced by structural members.

The geometry of the bulkhead 98 may be such that the bulkhead 98 occupies a generally planar region oriented generally parallel to the plane defined by the vertical direction 16 and horizontal direction 20. Stated differently, the bulkhead 98 may be oriented such that the longitudinal direction 12 is orthogonal thereto. The bulkhead 98 may be a continuous sheet of material having weight reducing openings or gaps in areas of little or no load, such that the bulkhead 98 still has sufficient structural strength to avoid excess deflection or yielding under expected operational loads.

In some embodiments, the rear surface 96 of the cockpit shell 90, or cockpit portion 90, has sufficient structural strength to serve as the bulkhead 98 and a separate bulkhead 98 may be omitted. In such embodiments, the rear surface 98 of the cockpit shell 90, or cockpit portion 90, may have any or all of the attributes of the bulkhead 98 described hereinabove.

Figure 6:
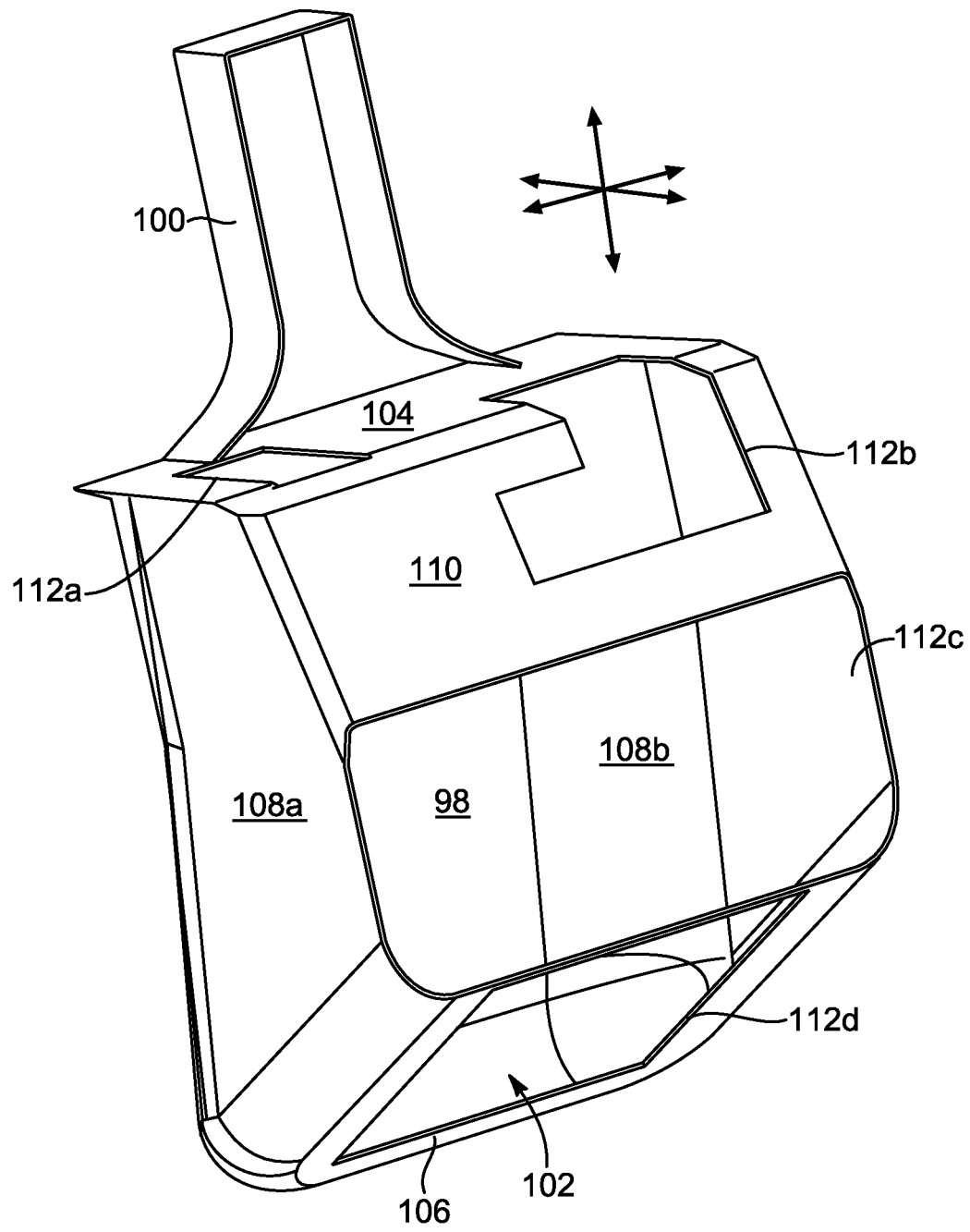
FIG. 6 is an isometric view of a bulkhead in accordance with an embodiment of the present invention.

Referring to FIG. 6, a mast mount 100 may secure to the bulkhead 98 to facilitate mounting of the mast 40 thereto. The bulkhead 98 may additionally define a compartment 102 for housing the engine 30 and may house one or more other components of the aircraft 10. The compartment 102 may be defined by an upper wall 104 and lower wall 106 secured to the bulkhead 98 and extending rearward therefrom. In the illustrated embodiment, the mast mount 100 is secured to the bulkhead 98 by means of the upper wall 104.

Side walls 108a, 108b may mount to opposing edges of the bulkhead 98 and extend rearward therefrom. The side walls 108a, 108b may additionally extend between the upper wall 104 and lower wall 106. An outer wall 110 may be offset rearward from the bulkhead 98 and extend between the side walls 108a, 108b and between the upper wall 104 and lower wall 106. One or more of the upper wall 104, lower wall 106, side wall 108a, side wall 108b, and back wall 110 may define openings 112a-112d to allow protrusion of components or access to the engine 30 or other components housed within the compartment 102.

Figure 7:
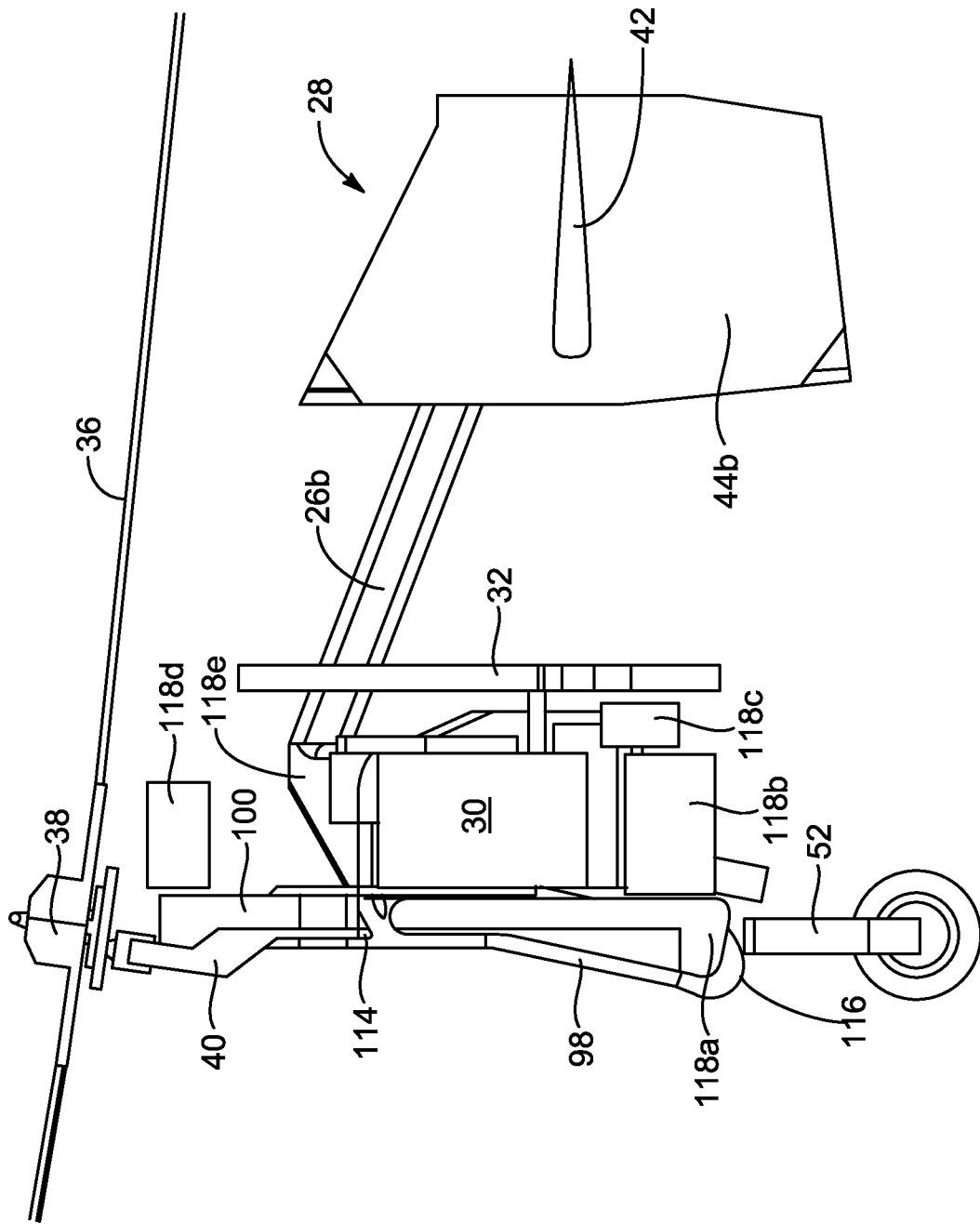
FIG. 7 is a side elevation cross-sectional view of an aft portion of a rotorcraft in accordance with an embodiment of the present invention.

FIG. 7 illustrates the engine 30 positioned within the compartment 102. The engine 30 may be mounted to the bulkhead 98 positioned between a point of attachment of the tailbooms 26a, 26b to the bulkhead 98 and the lower edge 116 of the bulkhead 98. Stated differently the tailbooms 26a, 26b may beneficially mount to the bulkhead 98 proximate the upper edge 114 thereof and the engine 30 may be well supported if it mounts to the bulkhead 98 between the upper edge 114 and the lower edge 116.

Other engine components 118a-118e may mount within or around the compartment 102. For example, a fuel tank 118a may be positioned between the engine 30 and the bulkhead 98. Such a fuel tank 118 may have a generally planar shape and be oriented generally parallel to the bulkhead 98. The engine components 118a-118e may include any and all components used to support operation and control of an engine and for coupling the engine to the propeller 32.

As noted previously, the mast 40 may secure to the mast mount 100. The mast 40 may be rotatably mounted to the mast mount 100 in order to facilitate changing of the orientation of the mast 40. Actuators for changing the angle of the mast 40 and for collectively and cyclically adjusting the pitch of the rotor blades 36 may likewise mount to the mast 40 or to the mast mount 100.

As also noted previously, the landing gear 52 may mount to the bulkhead 98 proximate the landing gear 52. The engine 30 may be mounted to the bulkhead 98 such that a point of attachment of the engine 30 to the bulkhead is located vertically between the points of attachment of the landing gear 52 and the mast mount 100.

The above described aircraft 10 having a bulkhead 98 having two or more of the tailbooms 26a, 26b, mast 40, engine 30, and landing gear 52 mounted thereon advantageously reduces the number of structural members required to support the loads and vibration caused by having the above-mentioned structures mounted thereto. In addition, for example, where the mast 40 and tailbooms 26a, 26b both mount to the bulkhead, any opposing moments are resolved by the bulkhead, reducing the need to add other structural members transferring these moments to the airframe 24.

Accordingly, the bulkhead may be reinforced enough with ribs, boxing in, thickness, and the like to handle such forces while other structural members may be more lightweight. Similarly, the bulkhead may have a section modulus and bulk enough to handle large stresses exerted at a point of attachment of the components mounted thereto. Other components of the airframe 24 may then be made to be more lightweight. The handling of stresses by the bulkhead reduces stresses exerted on and transferred through other components, including cyclic stresses, and therefore reduces fatigue stresses on other components of the airframe 24.

Figure 8:
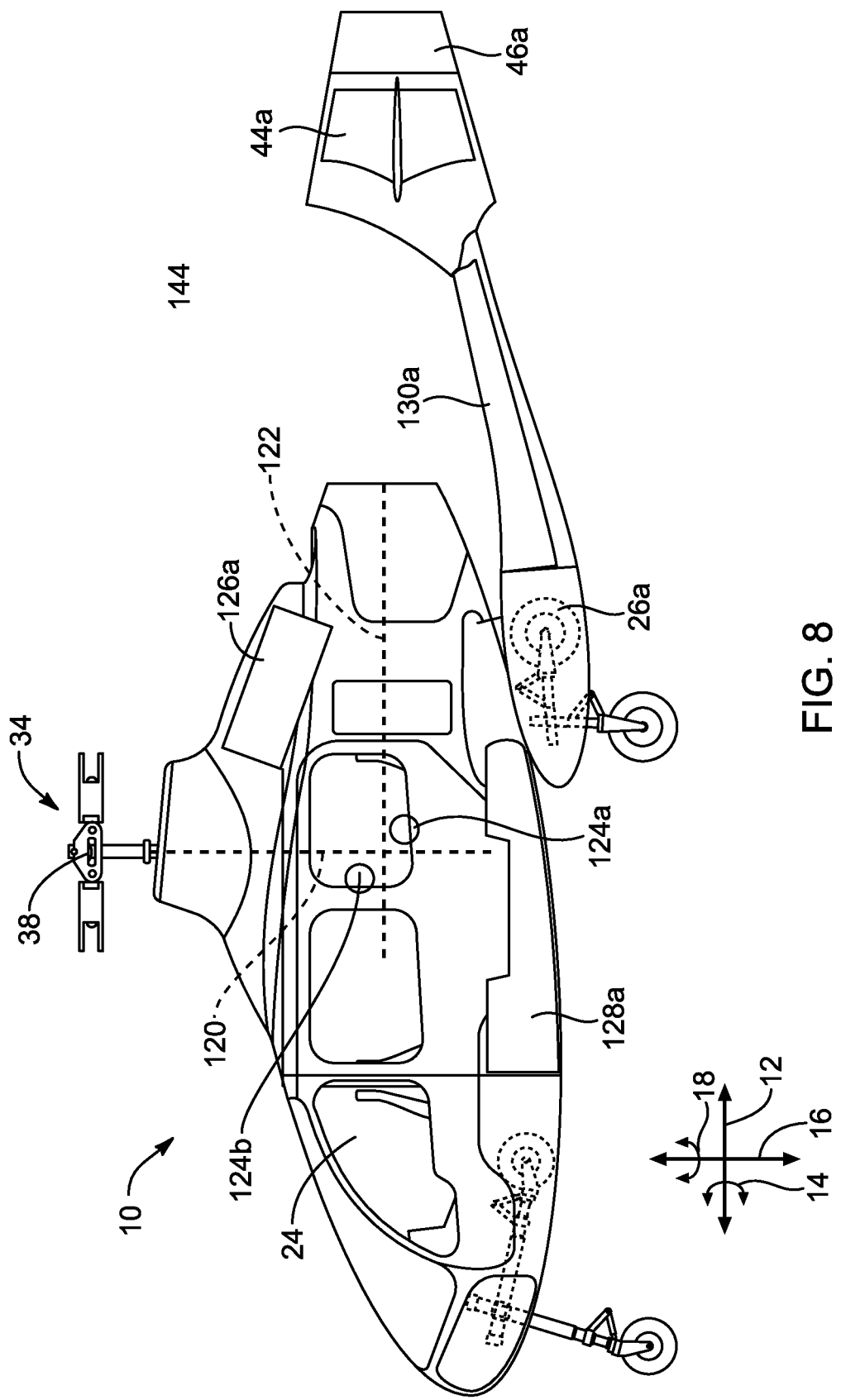
FIG. 8 is a side elevation view of a rotorcraft having fuel tanks in accordance with an embodiment of the present invention.

Referring to FIG. 8, the rotor 34 exerts a lift force on the airframe 24 directed along a rotor thrust vector parallel to the illustrated rotor thrust trajectory 120. The rotor thrust trajectory 120 may be generally parallel to the vertical direction 16 but may deviate significantly therefrom in some embodiments and modes of operation.

A propulsion source such as the propeller 32, jet engine, or some other propulsion source, exerts a propulsion force along a propulsion vector parallel to the illustrated propulsion thrust trajectory 122. The propulsion thrust trajectory 122 may be generally parallel to the horizontal direction 12 but may deviate significantly therefrom in some embodiments and modes of operation.

In operation, it is preferably that an aircraft 10, such as an autogyro or gyrodyne, be dynamically stable. Dynamic stability is the property of a dynamic system whereby oscillations or movements, once started, tend to damp out or reduce in amplitude over time. The main factor influencing static and dynamic stability in gyroplanes is the relative position of the aircraft center of gravity to the rotor thrust trajectory 120 and propulsion thrust trajectory 122. The rotor thrust trajectory 120 is preferably located aft of the horizontal position of the center of gravity (the station line position) and the propulsion trajectory 122 preferably passes within inches of the vertical position of the center of gravity (the waterline position). For example, the vertical position of the center of gravity may typically be within six inches, and preferably within two inches, of the propulsion trajectory 122.

For some rotorcraft, as shown in FIG. 8, dynamic stability is achieved for a center of gravity location 124a aft of the rotor thrust trajectory 120 and below the propulsion thrust trajectory. In some configurations, dynamic stability is achieved for a center of gravity location 124b in front of the rotor thrust trajectory 120 and above the propulsion trajectory 122. In some embodiments, where the center of gravity is forward of the rotor thrust trajectory 120, the center of gravity is proximate or coincident with the propulsion trajectory 122.

Figure 9:
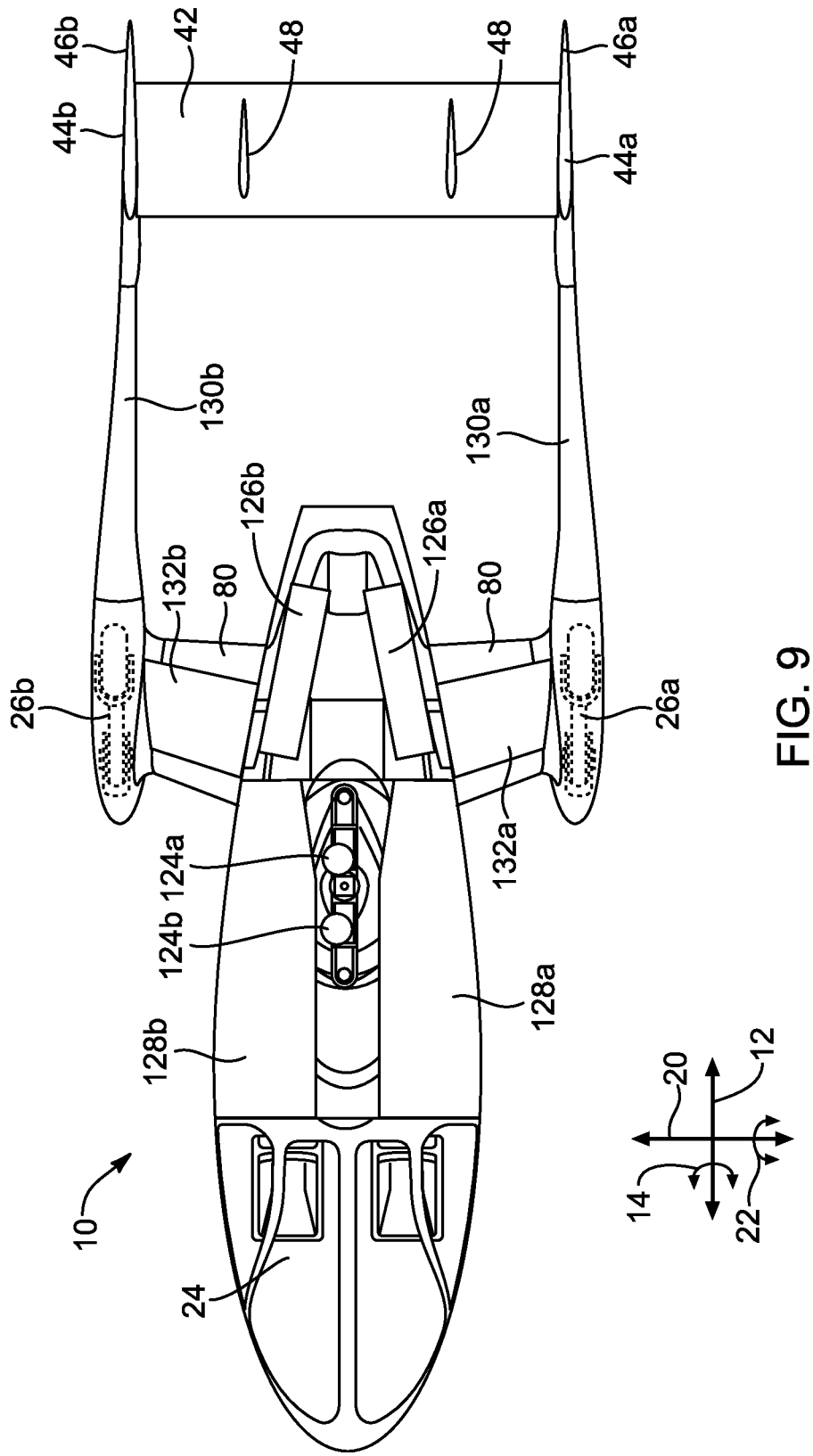
FIG. 9 is a top plan view of a rotorcraft having fuel tanks in accordance with an embodiment of the present invention.

Referring to FIG. 9, while still referring to FIG. 8, the aircraft 10 may include a plurality of fuel tanks characterized by one or more of laterally opposed positions, vertically opposed positions, and longitudinally offset positions. For example, vertically opposed positions may include one or more tanks 126a, 126b located near the mast 40. The portion of the airframe 24 to which the mast 40 is mounted may be referred to as a pylon.

Accordingly, the one or more tanks 126a, 126b may be located in or adjacent the pylon of the aircraft 10. One or more tanks 128a, 128b may be located near the belly of the aircraft 10 and therefore vertically offset from or opposed to the one or more pylon tanks 126a, 126b.

Likewise, tanks 130a, 130b may be located within the tailbooms 26a, 26b and be in a position vertically opposed to that of the tanks 126a, 126b. In embodiments having wings 80, or wing stubs 80, tanks 132a, 132b may be located within the wings 80 and thereby located in a position vertically opposed to that of the tanks 126a, 126b.

As is readily apparent in FIGS. 8 and 9, the tanks 132a, 132b in opposite wing stubs 80 are in laterally opposed positions. Likewise, the belly tanks 128a, 128b are in laterally opposed positions relative to one another, as are the tailboom tanks 130a, 130b. Where two tanks 126a, 126b are located near the mast 40 or pylon, they may be in laterally opposed positions with respect to one another.

Due to space constraints, in some embodiments, a single tank 126a is positioned near the mast 40 or pylon. As is also apparent in FIGS. 8 and 9, the tailboom tanks 130a, 130b are in a position longitudinally offset from that of the belly tanks 128a, 128b, wing stub tanks 132a, 132b, and pylon tanks 126a, 126b. The pylon tanks 126a, 126b may also be longitudinally offset from one or both of the wing stub tanks 132a, 132b and belly tanks 128a, 128b. The wing stub tanks 312a, 312b may be longitudinally offset from the belly tanks 128a, 128b.

Figure 10:
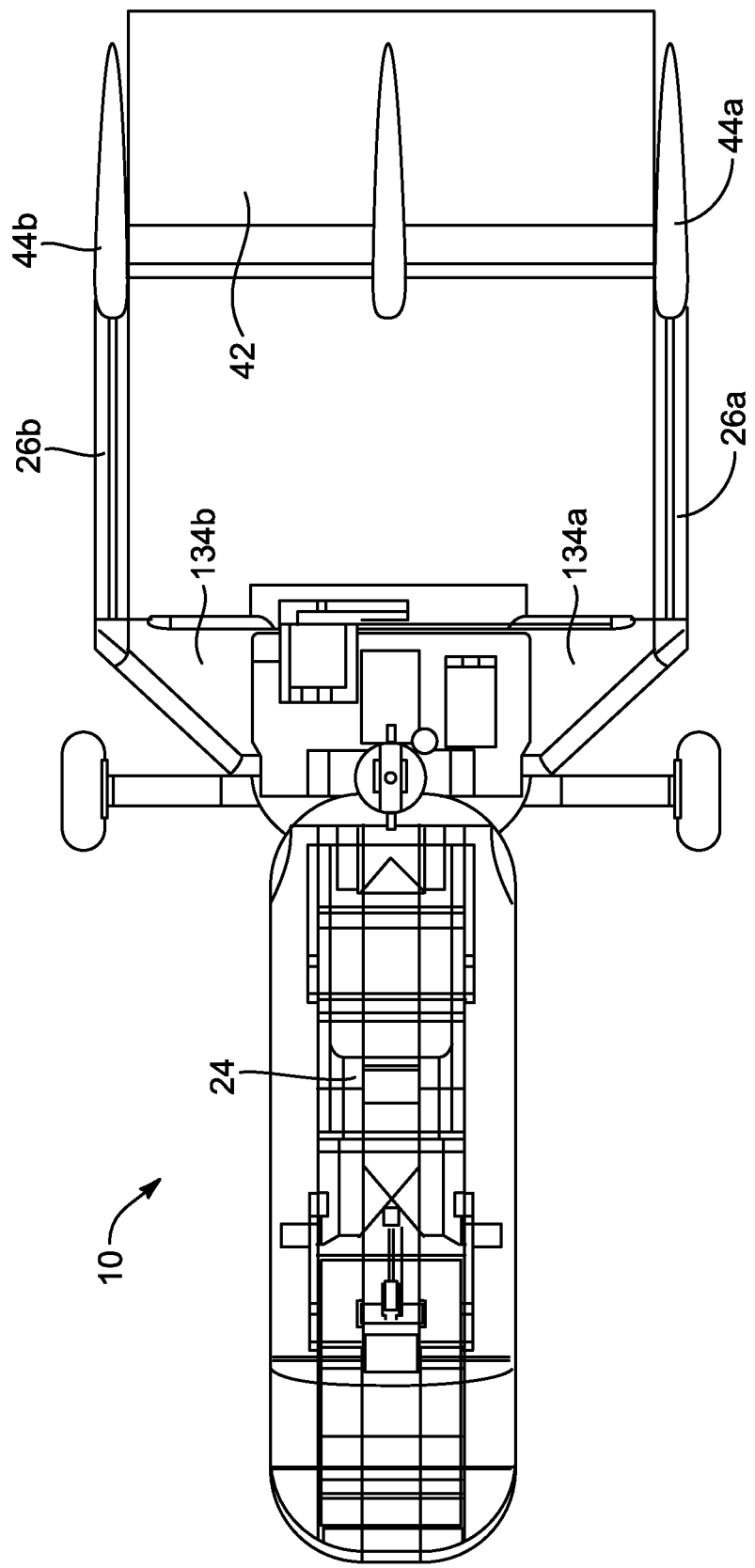
FIG. 10 is a top plan view of an alternative embodiment of a rotorcraft having fuel tanks in accordance with an embodiment of the present invention.

Referring to FIG. 10, for an airframe as illustrated in FIGS. 5-7, the tailbooms 26a, 26b may mount to the bulkhead 98, or some other portion of the airframe 24, by means of fuel tanks 134a, 134b. The fuel tanks 134a, 134b may mount to the bulkhead 98, or some other portion of the airframe 24. The tailbooms 26a, 26b may each mount to one of the fuel tanks 134a, 134b. The fuel tanks 134a, 134b may therefore have sufficient structural strength to support the tailbooms 26a, 26b during expected flight conditions.

The fuel tanks 134a, 134b may be longitudinally offset from a belly tank 128a, 128b. As noted with respect to FIG. 7, a fuel tank 118a may mount to the bulkhead 98 and may therefore be offset one or both of vertically and longitudinally from the fuel tanks 134a, 134b. As is apparent in FIG. 10, the fuel tanks 134a, 134b are also laterally offset from one another. The embodiment of FIG. 10 may also include tailboom tanks 130a, 13b longitudinally offset from the fuel tanks 134a, 134b.

Figure 11:
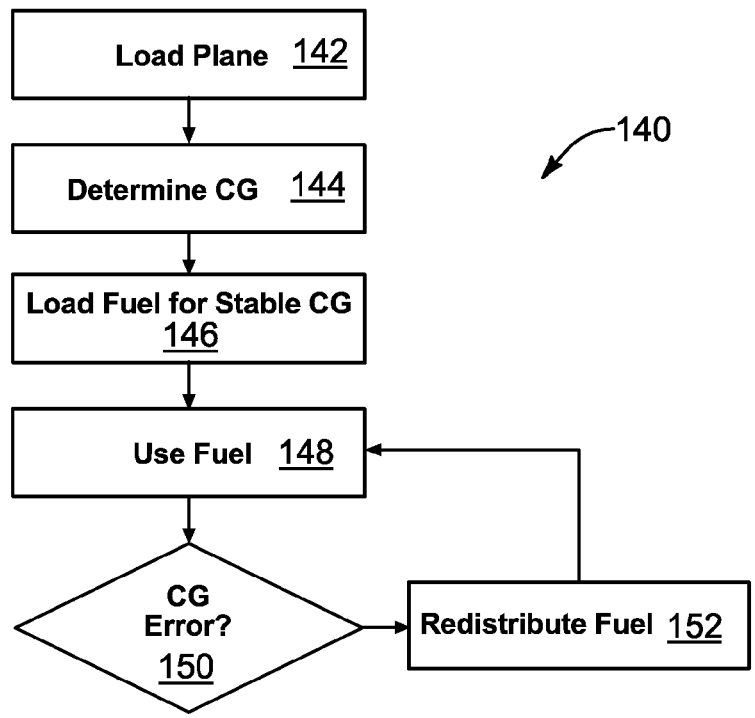
FIG. 11 is a process flow diagram of a method for operating a rotorcraft in accordance with an embodiment of the present invention.

FIG. 11 illustrates a method 140 for maintaining dynamic stability of a rotorcraft, such as a gyroplane. The method 142 may include loading a plane 142 with a pilot, and possibly one or more passengers and cargo. The center of gravity (CG) of the loaded aircraft is determined 144. Determining 144 the CG may include measuring the weight of one or more of pilot, passengers, and cargo and determining their effective position within the aircraft. The CG of the aircraft 10 may be predetermined and then updated based on the measured weight and position of people and cargo to be loaded. Fuel may then be selectively loaded 146 into fuel tanks 126-134 within the aircraft 10 CG in a mass distribution effective to achieve a CG that is dynamically stable as discussed hereinabove based on the CG of the aircraft 10 loaded with a pilot and any passengers or cargo.

In some embodiments, the fuel tanks of the aircraft 10 may be configured and distributed such that for a full load of fuel, the center of gravity will be in a dynamically stable position for a design load of pilot, passengers and/or cargo up to the rated weight limit for the aircraft 10. Accordingly loading 146 the aircraft 10 with fuel in such embodiments to achieve a dynamically stable CG position simply includes filling all the fuel tanks. For some flights, an aircraft 10 may not require a full load of fuel. In such instances, step 146 may include partially filling available fuel tank space in a pattern that will place the CG of the loaded aircraft in a stable position for a given load.

Fuel may then be used 148 to power the aircraft 10. As fuel is depleted from any tank 126-134, the center of gravity of the aircraft 10 may shift. Accordingly the deviation of the CG from a dynamically stable position toward a less dynamically stable position may be periodically evaluated 150. If the CG has shifted or would otherwise shift to a dynamically unstable position or to a less-than-adequate dynamically stable position, then fuel in the fuel tanks 126-134 may be redistributed 152 to urge the CG toward a more dynamically stable position.

Figure 12:
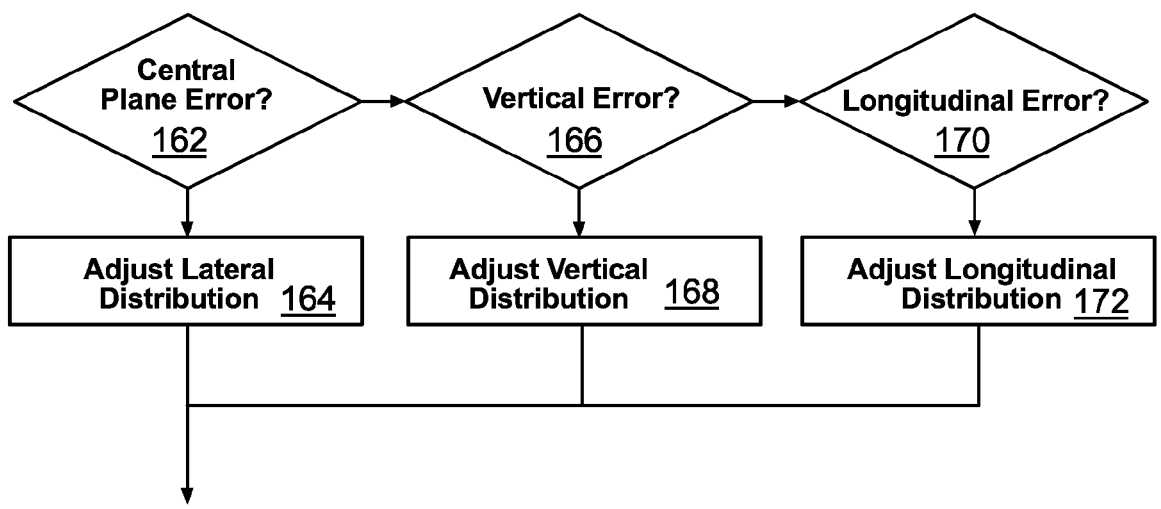
FIG. 12 is a process flow diagram of a method for redistributing fuel to maintain a center of gravity in a dynamically stable position in accordance with an embodiment of the present invention.

Referring to FIG. 12, redistributing 152 the fuel to urge the CG to a more dynamically stable position may include performing the illustrated method 160. The method 160 may include evaluating 162 whether the CG is offset or would become offset from a central plane that is parallel to the vertical direction 16 and longitudinal direction 12. If so, then the lateral distribution of the fuel is adjusted 164 to urge the CG closer to the central plane. Adjusting 164 generally may include transferring fuel between balancing offset tanks, such as between members of any balanced pair or other set of two or more of the tanks 126-134 described hereinabove as being offset to balance one another. For lateral balance, laterally offset tanks 126-134 are considered.

The method 160 may include evaluating 166 whether the vertical location of the CG is or will become (e.g., over time or at a rate of fuel use) offset from a desired dynamically stable vertical location. If so, then the vertical distribution of fuel may be adjusted 168 periodically, continually, or at a specified time. Adjusting 168 may include transferring fuel between vertically offset tanks, such as between any two or more of the tanks described hereinabove as being vertically offset from one another. The method 160 may similarly include evaluating 170 whether the longitudinal location of the CG is or will become offset from a desired dynamically stable location. If so, then the vertical distribution of fuel or fuel use may be adjusted 172. Adjusting 172 may include transferring fuel between longitudinally offset tanks, such as between any two or more of the tanks described hereinabove as being longitudinally offset from one another.

The steps of the method 160 may be performed simultaneously by means of a continuous feedback system. In some embodiments, the steps of evaluating 162, 164, 170 error in the location of the CG may be replaced with a pre-programmed fuel redistribution algorithm that monitors fuel usage and continuously or periodically redistributes fuel to a proper distribution given a remaining amount of fuel. In such embodiments, actual measurement of an error in the CG location may be omitted during normal flight once a suitable algorithm for fuel redistribution has been determined. Alternatively, the method 160 may include periodically or continuously selecting the tank from which fuel will be drawn for use in such a manner that balance is maintained between some pre-defined limits such that the CG is maintained in a dynamically stable position.

Figure 13:
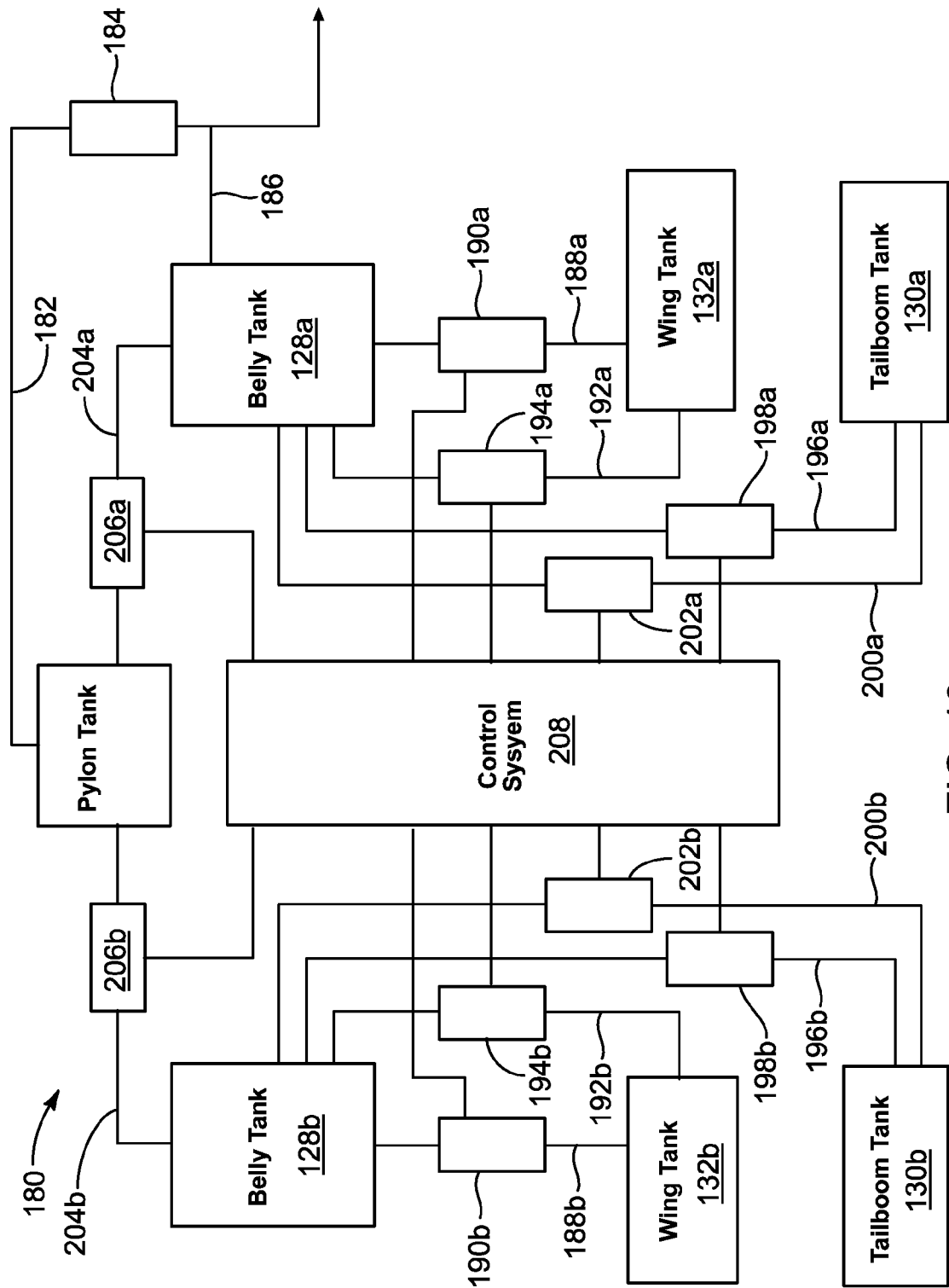
FIG. 13 is a schematic block diagram of a fuel system in accordance with an embodiment of the present invention.

FIG. 13 is a schematic diagram of a fuel distribution system 180 suitable for implementing the methods described hereinabove. In the illustrated embodiment, a fuel line 182 couples the one or more pylon tanks 126a, 126b to the engine 30, such as to a fuel injector or carburetor. A fuel filter 184, which may include a gascolator, may be interposed in the fluid path between the one or more pylon tanks 126a, 126b and the engine 30. Fuel supplied to the engine will therefore be drawn directly from the pylon tanks 126a, 126b. A return line 186 downstream from the fuel filter 184 may conduct fuel (drawn from the one or more pylon tanks 126a, 26b and not used by the engine 30) to one or both of the belly tanks 128a, 128b.

In the illustrated embodiment, the return line 186 is coupled only to the belly tank 128a. The belly tanks 128a, 128b may be coupled to the wing tanks 132a, 132b by fuel lines 188a, 188b. Pumps 190a, 190b may pump fuel from the wing tanks 132a, 132b to the belly tanks 128a, 128b, respectively. The pumps 190a, 190b may include check valves to prevent back flow. Lines 192a, 192b may conduct fuel from the belly tanks 128a, 128b to the wing tanks 132a, 132b using pumps 194a, 194b, respectively. The pumps 194a, 194b may include check valves to prevent back flow.

The belly tanks 128a, 128b may be coupled to the tailboom tanks 130a, 130b by means of fuel lines 196a, 196b, respectively. Pumps 198a, 198b force fuel along the lines 196a, 196b from the tailboom tanks 130a, 130b to the belly tanks 128a, 128b, respectively. Lines 200a, 200b may also couple the tailboom tanks 130a, 130b to the belly tanks 128a, 128b and pumps 202a, 202b may urge fuel from the belly tanks 128a, 128b to the tailboom tanks 130a, 130b, respectively. The pumps 198a, 198b, 130a, 130b may incorporate check valves to prevent back flow.

The belly tanks 128a, 128b may be coupled to the one or more pylon tanks 126a, 126b by lines 204a, 204b and pumps 206a, 206b may urge fuel from the belly tanks 128a, 128b to the one or more pylon tanks 126a, 126b, respectively. The pumps 206a, 206b may incorporate check valves to prevent back flow.

The illustrated fuel distribution system 180 is suitable for adjusting the CG of the aircraft 10. For example, to maintain the CG on a central plane, the pumps 206a, 206b may operate at the same or different rates when pumping fuel from the belly tanks 128a, 128b such that the amount of fuel on the right and left sides of the aircraft 10 remains the same or has a distribution effective to maintain the CG close to the central plane. The rate of flow of the pumps 206a, 206b pumping fuel to the one or more pylon tanks 126a, 126b may also be adjusted to adjust the vertical distribution of fuel between the one or more pylon tanks 126a, 126b and tanks positioned vertically therebelow. Such a draw control may be specified to operate at a rate effective to regularly or continually urge the CG of the aircraft toward a dynamically stable position The pumps 190a, 190b, the pumps 194a, 194b, the pumps 198a, 198b, and the pumps 202a, 202b may be used to adjust the longitudinal distribution of fuel among the belly tanks 128a, 128b, tailboom tanks 130a, 130b, and tailboom tanks 132a, 132b effective to urge the longitudinal position of the CG toward a more dynamically stable position.

For example, the pumps 198a, 198b may be activated to pump fuel from the tailboom tanks 130a, 130b to the belly tanks 128a, 128b to urge the position of the CG forwardly. Likewise, the pumps 202a, 202b may be activated to pump fuel from the belly tanks 128a, 128b to the tailboom tanks 130a, 130b and urge the position of the CG rearward.

The pumps 190a, 190b, 194a, 194b, 198a, 198b, 202a, 202b, 206a, 206b may be electrically, hydraulically, or mechanically coupled to a control system 208 programmed to activate the pumps in a sequence and at a delivery rate effective to implement the methods described hereinabove for maintaining dynamic stability of a rotorcraft.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A rotorcraft comprising:
   an airframe defining a center plane extending in longitudinal and vertical directions;
   a rotor mounted to the airframe and defining a rotor thrust vector;
   a propulsion source mounted to the airframe and defining a propulsion thrust vector;
   a plurality of fuel tanks distributed in one or more of laterally opposed positions, longitudinally opposed positions, and vertically opposed positions;
   the airframe further comprises a pair of tailbooms and an empennage mounted to the airframe by means of the tailbooms;
   the plurality of fuel tanks comprises fuel tanks positioned within the tailbooms;
   a fuel distribution system coupled to the plurality of fuel tanks;
   one or more pumps in fluid communication with the fuel distribution system; and
   a control system configured to actuate the one or more pumps effective to redistribute fuel among the plurality of fuel tanks to provide a distribution effective to urge a center of gravity of the aircraft closer to a dynamically stable position.

2. The aircraft of claim 1, wherein the dynamically stable position is positioned vertically based on the propulsion thrust vector and longitudinally forward of a trajectory of the rotor thrust vector.

3. The aircraft of claim 2, wherein the dynamically stable position is positioned on the center plane.

4. The aircraft of claim 1, wherein the dynamically stable position is positioned vertically below the propulsion thrust vector and longitudinally aft of a trajectory of the rotor thrust vector.

5. The aircraft of claim 4, wherein the dynamically stable position is positioned on the center plane.

6. The aircraft of claim 1, wherein:
the control system is programmed to redistribute fuel among the plurality of fuel tanks effective to urge the center of gravity closer to the center plane.

7. The aircraft of claim 1, wherein:
the control system is further programmed to redistribute fuel among the fuel tanks distributed in vertically opposed positions at a rate effective to urge the center of gravity toward the propulsion thrust vector; and
the control system is further programmed to redistribute fuel among the fuel tanks distributed in longitudinally opposed positions at a rate effective to urge the center of gravity forward of a trajectory of the propulsion thrust vector.

8. The aircraft of claim 1, wherein:
the control system is further programmed to redistribute fuel among the fuel tanks distributed in vertically opposed positions at a rate effective to urge the center of gravity below a trajectory of the propulsion thrust vector; and
the control system is further programmed to redistribute fuel among the fuel tanks distributed in longitudinally opposed positions at a rate effective to urge the center of gravity rearward of a trajectory of the propulsion thrust vector.

9. The aircraft of claim 1, wherein:
the airframe further comprises wings extending laterally therefrom; and
the plurality of fuel tanks comprises fuel tanks positioned within the wings.

10. The aircraft of claim 1, wherein:
the rotor is mounted to the airframe by means of a pylon; and
the plurality of fuel tanks comprises at least one fuel tank mounted to the airframe adjacent the pylon.

11. A method for operating a rotorcraft comprising:
selecting a rotorcraft comprising
a rotor mounted to an airframe, the rotor defining a rotor thrust vector,
a propulsion source mounted to the airframe and defining a propulsion thrust vector, and
a plurality of fuel tanks distributed in one or more of laterally opposed positions, longitudinally opposed positions, and vertically opposed positions;
an airframe comprising a pair of tailbooms and an empennage mounted to the airframe by means of the tailbooms, the fuel tanks being positioned within the tailbooms;
detecting a shift in a center of gravity of the rotorcraft to a first position;
redistributing fuel among the plurality of fuel tanks at a rate effective to shift the center of gravity to a second position that is more dynamically stable than the first position.

12. The method of claim 11, wherein the second position is located at a position selected from:
beneath a trajectory of the propulsion thrust vector and longitudinally behind a trajectory of the rotor thrust vector; and
proximate the trajectory of the propulsion thrust vector and longitudinally forward of the trajectory of the rotor thrust vector.

13. The method of claim 11, wherein the second position is positioned on a vertical and longitudinal center plane of the rotorcraft.

14. The method of claim 11, wherein the plurality of fuel tanks comprises fuel tanks distributed in laterally opposed positions, longitudinally opposed positions, and vertically opposed positions.

15. The method of claim 11, wherein:
the rotorcraft further comprises wings mounted to the airframe and extending laterally therefrom; and
the plurality of fuel tanks comprises fuel tanks positioned within the wings.

16. The method of claim 11, wherein:
the rotor is mounted to the airframe by a pylon; and
the plurality of fuel tanks comprises at least one fuel tank mounted to the airframe adjacent the pylon.

17. A method for operating a rotorcraft comprising:
selecting a rotorcraft comprising
an airframe,
a rotor mounted to the airframe, the rotor defining a rotor thrust vector,
a propulsion source mounted to the airframe and defining a propulsion thrust vector, and
a plurality of fuel tanks mounted to the airframe, the tanks of the plurality of fuel tanks being distributed in laterally opposed positions, longitudinally opposed positions, and vertically opposed positions;
detecting a shift in a center of gravity of the rotorcraft to a first position;
evaluating the first position relative to a second position, the second position being a more dynamically stable position for the center of gravity than the first position;
laterally redistributing fuel among the plurality of fuel tanks whenever the first position is laterally offset more than a predetermined distance from the second position;
vertically redistributing fuel among the plurality of fuel tanks whenever the first position is vertically offset more than a predetermined distance from the second position; and
longitudinally redistributing fuel among the plurality of fuel tanks whenever the first position is longitudinally offset more than a predetermined distance from the second position.

* * * * *